Jan. 9, 1968 J. T. KELLIS 3,363,110

BINARY STORAGE COUNTER

Filed Aug. 23, 1965 3 Sheets-Sheet 1

INVENTOR.

JAMES T. KELLIS

BY Harry R. Lubcke

AGENT

INVENTOR.
JAMES T. KELLIS

BY Harry R. Lubcke
AGENT

INVENTOR.
JAMES T. KELLIS
BY Harry R. Lubcke
AGENT

United States Patent Office 3,363,110

Patented Jan. 9, 1968

3,363,110

BINARY STORAGE COUNTER

James T. Kellis, Tustin, Calif., assignor to Electronic Engineering Company of California, Santa Ana, Calif., a corporation of California Filed Aug. 23, 1965, Ser. No. 481,784
6 Claims. (Cl. 307—225)

ABSTRACT OF THE DISCLOSURE

A simplified binary storage counter employing a combination of only certain parts of staircase generators and plural connected flip-flops heretofore used. A minimum of two transistors in one flip-flop circuit combined with two staircase generator circuits act to alternately charge the latter according to the status of the flip-flop. The count is taken from the flip-flop. Each step increment of the staircase is twice as high as previously attained, thus enhancing accuracy. A pair of diodes connected to the transistors reduces the load on the source of incoming pulses to one-half usual. The count may be altered by only altering a bias voltage, as well as by changing component values.

This invention relates to an electrical counter and more particularly to such a device in which incremental storage of electrical charge and electrical flip-flop are combined.

The need for counting in electrical circuits of the computer type has frequently been met by the staircase generator, or by a plurality of flip-flops connected to give an output pulse only after several input pulses had been impressed upon the input flip-flop.

This invention departs from both of these devices and employs only parts of each. This makes for simplicity and for reliable operation.

It is known that the reliability of always making the same count by a staircase generator is impaired if the count is large. This is because the incremental increase in voltage of the storage capacitor is small for each step and also because the incremental increase decreases with the accumulation of several steps; i.e., the last and critical step is a smaller increase in amplitude than is the first step.

When flip-flops are employed for counting, four active elements, such as transistors or vacuum tubes, are required with associated circuitry to provide a count of four, and six are required for a count of eight.

According to this inventon only two active elements are employed. These react as a flip-flop to alternately allow two staircase generator circuits to charge in ascending steps, each being subsequently quickly discharged by the operation of the flip-flop circuit. It is seen that this novel structure requires only half as many steps in each staircase; thus the amplitude of each step is twice what it would be were only one staircase generator employed.

By providing an auxiliary potential it is possible to alter the count of the counter by purely electrical means. This allows a particular count to be selected and retained for a given apparatus, or by varying the auxiliary potential according to any desired pattern in time, to have the counter count to a given count for a period of time, to another count for another period of time, and so on.

In addition to the basic circuit that has been sketched in words above, the circuit may be made to operate to higher frequencies by adding clamping elements. It may also be provided with an output buffer circuit, and/or an input driver circuit, which driver circuit may also be clamped. Particularly advantageous at higher frequencies is an alternate embodiment having cross-connection of the staircase generator diodes, so that only one generator at a time loads the input driving circuit. This arrangement reduces the driving energy required by one-half.

An object of this invention is to provide a simple and reliable electrical counter.

Another object is to provide an electrical counter in which the count can be determined by applying an externally supplied voltage.

Another object is to provide an electrical counter suited for high frequency operation, in that the reset time does not enter into the operation of the counter.

Another object is to provide an electrical counter that requires less than usual electrical driving energy.

Another object is to provide an electrical counter in which the count can be determined at the time of arrival of an auxiliary electrical pulse.

Another object is to provide an electrical counter that may be fabricated from relatively inexpensive components.

Another object is to provide an electrical counter that will function as intended despite alteration of ambient conditions or electrical supply values.

Other objects will become apparent upon reading the following detailed specification and upon examining the accompanying drawings, in which are set forth by way of illustration and example certain embodiments of the invention.

Figure 1:
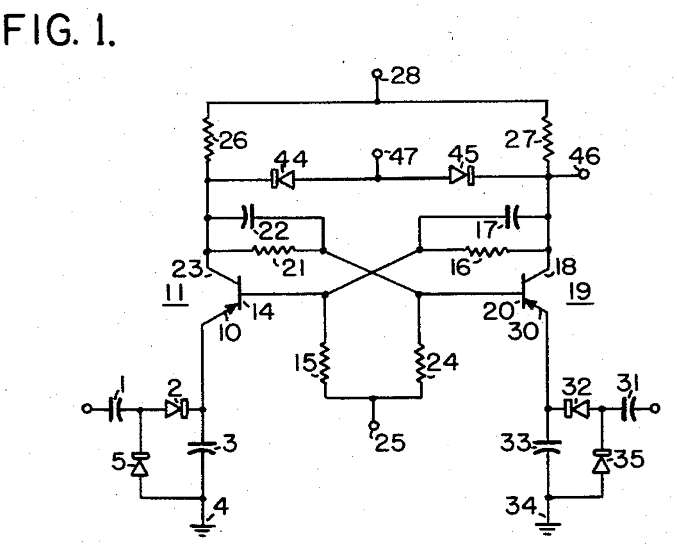
FIG. 1 shows a basic circuit according to the invention.

In FIG. 1, numeral 1 indicates an input coupling capacitor. For an operating frequency of the order of 10 megacycles ($10^7$ cycles per second) this capacitor may have a capacitance of the order of 22 picofarads, (pf.), ($22 \times 10^{-12}$ farads). This capacitor connects to the anode of diode 2, the cathode of which diode connects to storage capacitor 3, the second terminal of which capacitor connects to a common, or ground, connection 4. Diode 2 may be of the usual semiconductor type, and capacitor 3 may have a capacitance of 100 pf. Shunt diode 5 has its anode connected to ground and its cathode connected to the connection between elements 1 and 2.

When voltage pulses are applied to input coupling capacitor 1, diode 2 passes positive pulses of current through capacitor 1 to form steps of charge upon capacitor 3, whereas diode 5 bypasses negative pulses, thereby allowing capacitor 1 to be discharged after each positive pulse. A step is formed as shown at 7 in FIG. 4 upon the arrival of the first positive pulse to be counted, and at 8 upon the arrival of the second positive pulse to be counted.

These increases in positive potential at the ungrounded terminal of capacitor 3 are impressed upon emitter 10 of first transistor 11; there being a connection between elements 3 and 10. This transistor is initially non-conducting until the third step 9 finally reverses this situation at peak 12 in FIG. 4. Base 14 of transistor 11 connects to one terminal of resistor 15, and also to one terminal of the shunt connected pair, resistor 16 and capacitor 17. The second terminals of each of the latter are connected to collector 18 of second transistor 19. The two transistors are connected symmetrically to equivalent circuit components. Thus, base 20 of transistor 19 connects to shunt-connected resistor 21 and capacitor 22, the second terminals of each connecting to collector 23 of transistor 11. Similarly, resistor 24 is connected to base 20 of transistor 19. The second terminals of resistors 15 and 24 are connected together and to terminal 25. The latter is typically connected to a source of positive voltage, such as the positive terminal of a 12 volt battery. The negative terminal of the same is connected to ground 4. This voltage serves to bias the base terminals of the transistors, so that these are alternately maintained in a non-conducting state.

Transistors 11 and 19 may be of the PNP type 2N779A. Resistors 16 and 21 may each have resistance values of 3,600 ohms, and capacitors 17 and 22 each a capacitance of 22 pf. Resistors 15 and 24 may each have a resistance of 12,000 ohms.

Collector 23 of transistor 11 connects to resistor 26, of 1,000 ohms resistance, and therethrough to terminal 28. Collector 18 of transistor 19 connects to resistor 27, of 1,000 ohms resistance, and therethrough also to terminal 28. The latter is typically connected to a source of negative voltage, such as the negative terminal of a 12 volt battery, the positive terminal of the same being connected to ground 4. This is the powering voltage for the transistors.

A second staircase generator comprised of elements 31 through 35 has the same interconnection and circuit values as the prior group 1 through 5, save that storage capacitor 33 is connected to emitter 30 of transistor 19 rather than to emitter 10 of transistor 11. Capacitors 1 and 31 both receive input pulses to be counted. These may be separated as shown when separate input sources are employed and may be connected together and to a single input source if desired. The latter mode of connection is normal. However, if separate driving circuits are used for each capacitor, then the separate sources connection is employed.

Figure 4:
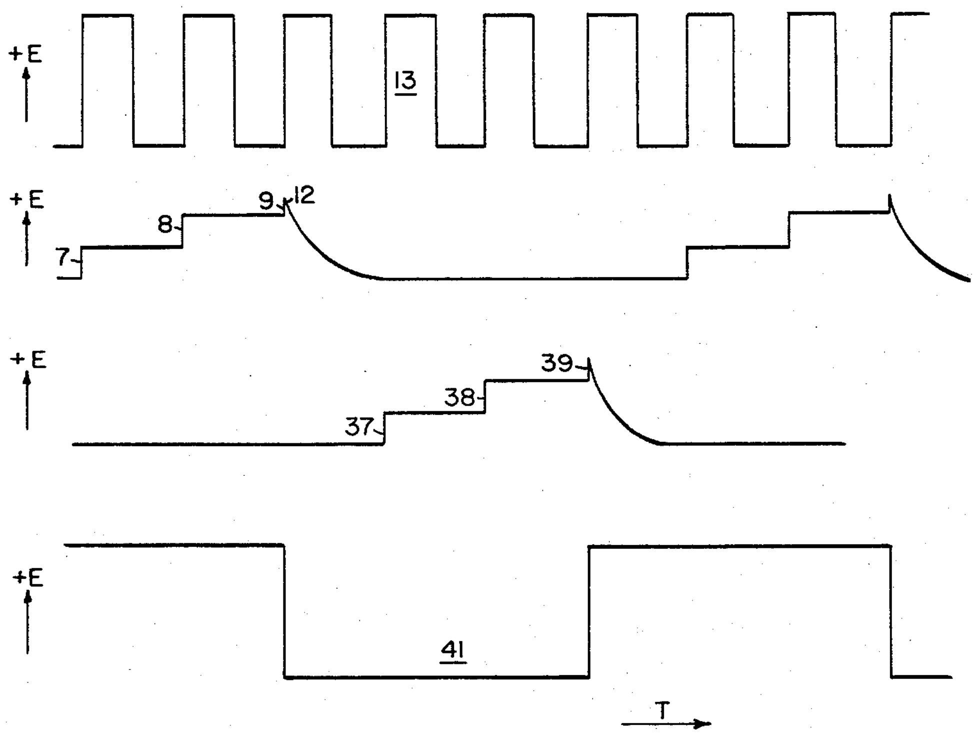
FIG. 4 shows waveforms illustrating circuit operation.

Staircase generator 31–35 makes three steps, 37, 38 and 39, when transistor 19 is not conducting, in the illustrative performance of a count of six shown in FIG. 4. It will be understood from the time scale of the abscissas of the waveforms in FIG. 4 that transistor 11 is first non-conducting, then transistor 19 is non-conducting, and that this state flip-flops; with first one transistor non-conducting while the other is conducting, and vice versa. This results in a count of six at the output waveform 41. This is the waveform present at collector 18 of transistor 19 at terminal 46.

The above-described circuit represents the minimum number of components desirable in fabricating the counter according to this invention.

It is usually preferred to add two more diodes 44 and 45, to clamp the output, which is obtained at terminal 46. This gives a faster transition time and thus allows higher frequency operation. The cathode of diode 44 is connected to collector 23 of transistor 11 and the cathode of diode 45 is connected to collector 18 of transistor 19. The anodes of these diodes are connected together and to terminal 47, which is typically connected to a source of supply voltage of negative 6 volts. This voltage may be obtained from a half-voltage tap on the battery previously mentioned as connected between terminal 28 and ground 4. Higher frequency operation is obtained with these clamping diodes because capacitors 17 and 22, and other parasitic capacitances which unavoidably load the outputs, are charged more rapidly to the reduced clamp voltage level.

Figure 2:
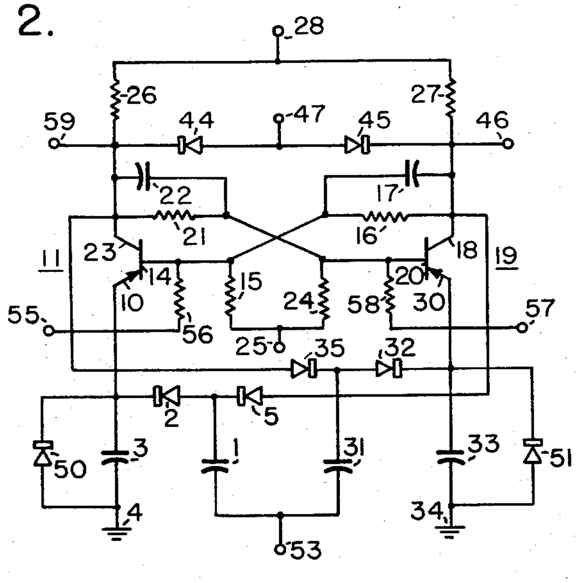
FIG. 2 shows a circuit having alternate staircase generator gating means.

The circuit of FIG. 2 embraces all of the elements of the circuit of FIG. 1, and these have been given the same reference numerals in both figures. The electrical values of the components may, of course, be reasonably different if different frequency ranges are to be accommodated, or for other reasons of circuit design.

In FIG. 2 a new connection is made with respect to diode 5. Instead of being connected to ground, the anode of diode 5 is connected to collector 18 of transistor 19. When transistor 19 is not conducting and capacitor 33 is accumulating a step charge, diode 5 is back biased, i.e., the potential of the cathode is more positive than the potential of the anode, and so current does not flow through the diode. Of course, when transistor 19 is conducting, diode 5 is essentially connected to ground, it is not back-biased, and it does pass negative pulses in the manner described in connection with the operation of FIG. 1.

The situation is the same for reconnected diode 35, as is the functioning of step generator 1–5 when the flip-flop has flipped and capacitor 3 is accumulating a charge.

Because of the back bias, pulses are not passed to the opposite step capacitor in each instance, and so the load on the input source of pulses, connected to terminal 53, is only half what it would normally be. This saving is important at high operating frequencies, such as 10 megacycles, because at this frequency large currents are required to charge even small capacitors because of the shortness of each cycle.

In FIG. 2, additional diodes 50 and 51 are required. The anodes thereof are connected to ground and the cathodes are connected to emitters 10 and 30, respectively. These provide paths for emitter current when transistor 11 or 19 is conducting. In FIG. 1, diodes 5 and 2, and 35 and 32, each group in series connection, served this purpose.

Further new elements in FIG. 2 include terminal 55 and resistor 56. The resistor is connected between the terminal and base 14 of transistor 11. The resistor may have a resistance of 15,000 ohms. A symmetrical arrangement in this respect is normally employed, including also terminal 57, with resistor 58 connecting therefrom to base 20 of transistor 19.

By impressing a negative pulse upon either of terminals 55 or 57 the count taking place in storage capacitor 3 or 33, respectively, can be halted. Alternately, a negative voltage may be maintained upon either or both of these terminals and the amplitude of that voltage determines how high the count will be on the respective storage capacitor before the associated transistor flops from non-conduction to conduction. It is in this way that the embodiment of FIG. 2 can be made to count to a number determined by the timing of the pulses or the amplitude of the control voltage, rather than only upon the electrical characteristics involved in timing the flip-flop.

In this way it is seen that one half of the flip-flop may be made to count two, while the other half is made to count three, according to the respective control voltages. By employing other control voltage values each side may be made to count to two, to four, etc., as desired.

Further considering this matter, it is seen that the circuit of FIG. 1 is symmetrical, and will therefore count an even number of pulses, of itself. For example, assume that the circuit of FIG. 1 counts six pulses with a driving pulse amplitude of approximately 6 volts. The addition of resistors 56 and 58 in FIG. 2 allows the pulses counted to be reduced to four if a negative voltage of approximately 6 volts is applied to both terminals 55 and 57. A count of five is obtained by applying the negative voltage to only one terminal.

Outputs of opposite phase are available at output terminals 46 and 59 of FIG. 2.

Figure 3:
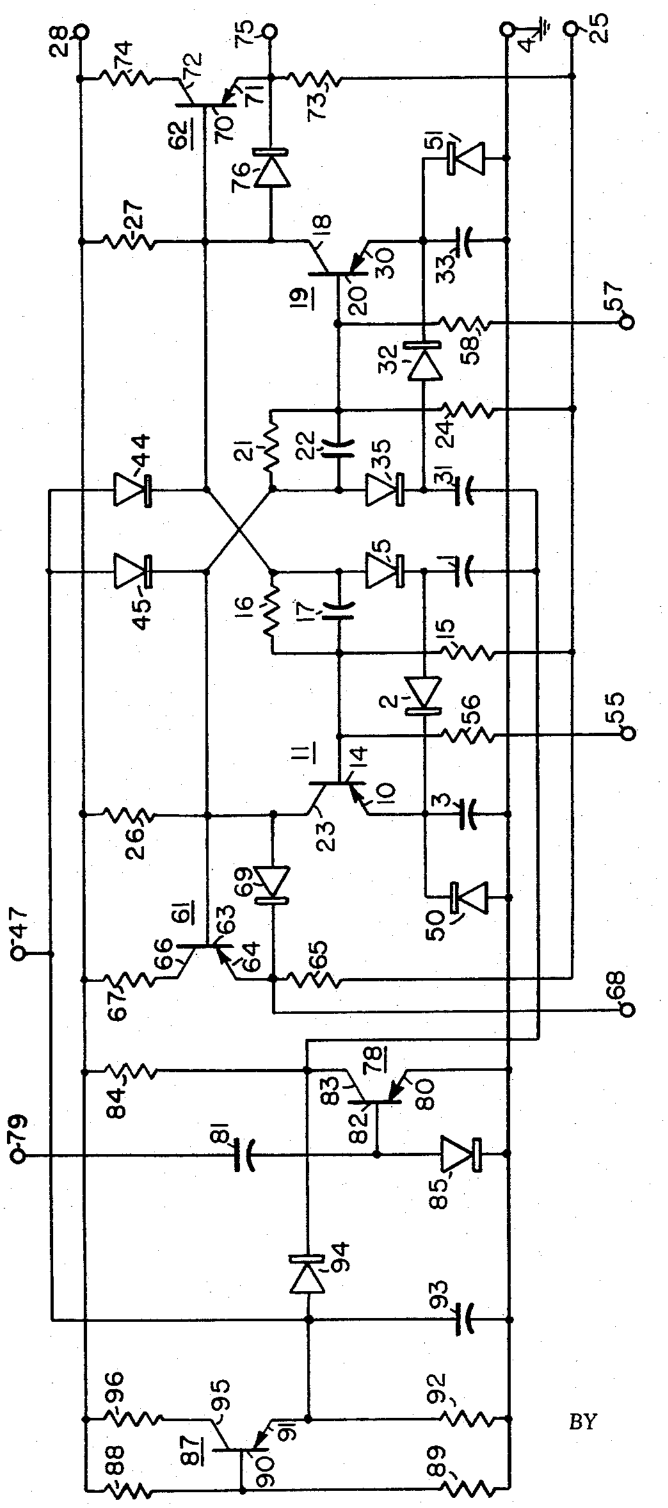
FIG. 3 shows a circuit according to the invention which includes driver and buffer output means.

FIG. 3 shows essentially the circuit of FIG. 2, with input driver means and output buffer means added, as may be desired in circuit applications where the input is primarily successive current pulses rather than voltage pulses. Those circuit elements that are the same in FIG. 3 as they were in FIG. 2 have the same reference numerals. The exact electrical values may vary according to need, as will be understood.

Transistors 61 and 62 are connected as emitter followers to buffer (isolate) the storage counter from impedance-modifying effects and other effects of external loads. Base 63 of transistor 61 connects directly to collector 23 of transistor 11. Emitter 64 connects to resistor 65, which may have a resistance of 4,700 ohms. The second terminal of resistor 65 connects to terminal 25, an electrical energizing source of typically plus 12 volts. Collector 66 connects to resistor 67, of 220 ohms, the second terminal of which connects to supply terminal 28, typically a minus 12 volt source. Resistor 67 is included to prevent a burn-out current from flowing in transistor 61 if output terminal 68 is shorted.

Diode 69 is connected with anode to collector 23 of flip-flop transistor 11 and with cathode connected to emitter 64 of output transistor 61. This enables capacitive loads to be charged more rapidly in the positive direction by allowing collector current from transistor 11 to flow into the output load at terminal 68.

The elements of the other buffer transistor, 62; i.e., base 70, emitter 71 and collector 72, and the associated circuit elements; resistors 73 and 74, output terminal 75 and diode 76, have the same connections and function as the corresponding elements of and those associated with transistor 61. Both transistors may be of the 2N779A type.

The driver circuit, adapted to accept a current rather than a voltage input, is comprised of transistor 78. This may also be of the 2N779A type. The input enters the circuit at terminal 79 and ultimately leaves it via ground connection 4, to which emitter 80 of this transistor is directly connected. The current pulses, as 13 in FIG. 4, pass through capacitor 81, which may have a capacitance of 470 pf., and to base 82 of transistor 78, causing the latter to be driven to a saturated condition. Collector 83 connects to resistor 84, of 820 ohms resistance, the second terminal of which resistor connects to minus 12 volt terminal 28. Additionally, collector 83 connects to the cathode of clamp diode 94. The anode of diode 85 connects to base 82 and the cathode of that diode connects to ground 4, to allow discharge of capacitor 81 after each current pulse. Collector 83 of the driver transistor connects to capacitors 1 and 31 in FIG. 3, this element being the equivalent of input terminal 53 of FIG. 2.

PNP transistor 87, which may be of the 2N1305 type, is connected as an emitter follower to supply clamp voltage to input stage 78 and counter transistors 11 and 19. The magnitude of the clamp voltage is determined by the ratio of resistors 88 and 89, which resistors are connected in series between negative supply terminal and ground 4. A resistance value of 1,000 ohms may be used for each resistor, thus giving a minus 6 volt clamping voltage at base 90, according to the example of FIG. 3. Emitter 91 connects through emitter load resistor 92, of 470 ohms, to ground 4, and also to capacitor 93 and the anode of diode 94. The second terminal of capacitor 93 connects to ground and this capacitor supplies the required surges of clamping current through diodes 94, 44 and 45. Collector 95 of transistor 87 connects to resistor 96, of 220 ohms resistance, for protection purposes, and thence to supply terminal 28. All of the diodes in FIG. 3 may be of the EE401 type, which is similar to the 1N995 type.

The circuit of FIG. 3 operates according to the showing of FIG. 4, as did the previously described circuits.

It will be recognized that other driver circuits may be used in connection with the counter of this invention, as for voltage inputs, in which the driver circuit would serve to perform a voltage or an impedance transformation.

This invention has been described in its preferred form with particularity, by way of example, only. Modification of the characteristics of the circuit elements and details of circuit connections may be taken without departing from the scope of the invention.

Having thus fully described the invention, I claim:

1. A binary storage counter comprising;

(a) a source of pulses, (b) a pair of transistors, each having an emitter, base and collector, (c) means to cross-couple the collector of each said transistor to the base of the other transistor to form a flip-flop, (d) a storage capacitor connected to each said emitter and to a common connection, (e) a diode means connected from each said collector of said pair of transistors to the said storage capacitor that is connected to said emitter of the other transistor of said pair of transistors to charge each said capacitor in incremental steps upon successive pulses being impressed upon said diode means from said source of pulses, (f) bias means connected to each said base to withhold the flow of current through one of said pair of transistors until said storage capacitor connected to the emitter thereof is charged to a given potential, while current does flow in the other transistor of said flip-flop;

said means to cross couple causing said current flow to alternate between said pair of transistors for alternately discharging each said storage capacitor.

2. The binary storage counter of claim 1, which additionally includes;

(a) a pair of diodes each connected in the same polarity to said collectors of said pair of transistors and to a source of potential to clamp the output excursions of said flip-flop.

3. The binary storage counter of claim 1, which additionally includes;

(a) a pair of resistive means, each having first and second terminals, (b) a connection from each said first terminal to a said base of said pair of transistors, and (c) a voltage supply connected to said second terminal of each said resistive means to determine the number of said successive pulses to be accumulated as a charge upon a said storage capacitor in combination with a voltage provided by said voltage supply to a said base to effect current flow in the said transistor having said base.

4. The binary storage counter of claim 1, which additionally includes;

(a) a diode connected to each collector of said pair of transistors, and (b) an emitter follower transistor connected to each said diode to act as an output buffer.

5. The binary storage counter of claim 1, which additionally includes;

(a) a further transistor connected to said source and through said diode means to said storage capacitors, to drive said counter with said input pulses.

6. The binary storage counter of claim 5, which additionally includes;

(a) rectifier means connected to said further transistor, (b) a still further transistor having an emitter connected to said rectifier means, and (c) biasing means connected to said still further transistor to provide a clamp voltage upon said further transistor.

References Cited

UNITED STATES PATENTS

| | | | |
|---|---|---|---|
| 2,489,824 | 11/1949 | Shenk | 315—84.5 XR |
| 3,046,413 | 7/1962 | Clapper | 307—88.5 |

ARTHUR GAUSS, *Primary Examiner.*

J. ZAZWORSKY, *Assistant Examiner.*